United States Patent
Hussain et al.

(10) Patent No.: US 12,415,735 B2
(45) Date of Patent: Sep. 16, 2025

(54) SOL-GEL MATERIAL, AND USE THEREOF

(71) Applicant: TECHNOLOGICAL UNIVERSITY DUBLIN, Dublin (IE)

(72) Inventors: C. M. Iftekhar Hussain, Dublin (IE); Mohamed Oubaha, Dublin (IE); Brian Norton, Dublin (IE); Aidan Duffy, Dublin (IE)

(73) Assignee: TECHNOLOGICAL UNIVERSITY DUBLIN, Dublin (IE)

( * ) Notice: Subject to any disclaimer, the term of this patent is extended or adjusted under 35 U.S.C. 154(b) by 152 days.

(21) Appl. No.: 17/295,179

(22) PCT Filed: Nov. 20, 2019

(86) PCT No.: PCT/EP2019/081986
§ 371 (c)(1),
(2) Date: May 19, 2021

(87) PCT Pub. No.: WO2020/104556
PCT Pub. Date: May 28, 2020

(65) Prior Publication Data
US 2022/0009792 A1    Jan. 13, 2022

(30) Foreign Application Priority Data

Nov. 20, 2018 (GB) .................................... 1818900

(51) Int. Cl.
*C01G 53/04* (2025.01)
*F23D 14/12* (2006.01)
*H02S 10/30* (2014.01)

(52) U.S. Cl.
CPC ............ *C01G 53/04* (2013.01); *F23D 14/12* (2013.01); *H02S 10/30* (2014.12); *C01P 2002/50* (2013.01)

(58) Field of Classification Search
CPC ... C01G 53/04; C01F 5/02; C01F 7/02; H02S 10/30; F23D 14/12; C01P 2002/50
See application file for complete search history.

(56) References Cited

U.S. PATENT DOCUMENTS

| 5,865,906 A | 2/1999 | Ferguson et al. |
| 2013/0199600 A1 | 8/2013 | Lee et al. |
| 2013/0280854 A1 | 10/2013 | Jasieniak et al. |

FOREIGN PATENT DOCUMENTS

CN    108285406 A  *  7/2018   ............ B01J 23/755

OTHER PUBLICATIONS

Li, Lei, et al. "Synthesis and characterization of NiO-doped p-type AZO films fabricated by sol-gel method." Materials Letters 68 (2012): 283-286.*

(Continued)

*Primary Examiner* — Richard M Rump
(74) *Attorney, Agent, or Firm* — Nixon Peabody LLP; David S. Resnick; Ravinderjit S. Braich

(57) ABSTRACT

A thermophotovoltaic (TPV) system, comprises a substrate, an emitter material adhered to the substrate, and a thermophotovoltaic (TPV) cell. The emitter material is a typically a metal oxide doped nickel oxide sol-gel material, in which the metal is magnesium or zirconium, and in which the sol-gel material comprises 97-99 mol % metal oxide, and about 1-3 mol % nickel oxide dopant. Providing an emitter material as a sol-gel allows the material to be coated on to surfaces providing better adherence to the surface, and also provides excellent heat stability. A sol-gel material is also described.

2 Claims, 3 Drawing Sheets

(56) References Cited

OTHER PUBLICATIONS

Razpotnik, Tanja, and Jadran Măek. "Synthesis of nickel oxide/zirconia powders via a modified Pechini method." Journal of the European Ceramic Society 27.2-3 (2007): 1405-1410.*

Karnaukhov, Timofey, et al. "Synthesis and characterization of nanocrystalline M—Mg—O and carbon-coated MgO systems." Materials Science Forum. vol. 917. Trans Tech Publications Ltd, 2018.*

Dongare, Mohan K., et al. "Oxidation activity and 18O-isotope exchange behavior of nickel oxide-stabilized cubic zirconia." Journal of Catalysis 222.1 (2004): 80-86.*

Delir Kheyrollahi Nezhad, Parastoo, et al. "Sol-gel preparation of $NiO/ZrO_2$ (x)-MgO (100-x) nanocatalyst used in $CO_2/O_2$ oxidative dehydrogenation of ethane to ethylene: influence of Mg/Zr ratio on catalytic performance." Journal of Sol-Gel Science and Technology 80 (2016): 436-450.*

Arda, L., M. Açkgöz, and A. Güngör. "Magnetic and microstructure properties of Ni-Doped ZnO films and powder by sol-gel process." Journal of superconductivity and novel magnetism 25 (2012): 2701-2705.*

Hassan, Tunis B. "Gas sensing performance of Sol-gel grown NiO-doped $Cr_2O_3$ nanoparticles." Iraqi Journal of Physics 16.37 (2018): 15-22.*

Fraas, L., et al. "Burner, emitter, and recuperator development for lightweight thermophotovoltaic power supply." 2015 IEEE 42nd Photovoltaic Specialist Conference (PVSC). IEEE, 2015.*

Xuan, Yimin, Xue Chen, and Yuge Han. "Design and analysis of solar thermophotovoltaic systems." Renewable Energy 36.1 (2011): 374-387.*

Norton, Brian, Aidan Duffy, and Mohamed Oubaha. "Hybrid Solar Thermophotovoltaic-Biomass/Gas Power Generation System with a Spectrally Matched Emitter for Lower Operating Temperatures." (2017).*

Ferguson, Lucian G., and Fatih Dogan. "A highly efficient NiO-Doped MgO matched emitter for thermophotovoltaic energy conversion." Materials Science and Engineering: B 83.1-3 (2001): 35-41.*

Pfiester, Nicole A., and Thomas E. Vandervelde. "Selective emitters for thermophotovoltaic applications." Physica status solidi (a) 214.1 (2017): 1600410.*

Study and optimization of ceramic coatings for thermophotovoltaic applications.*

Al-Rashedi et al. "Nickel oxide thin film synthesis by sol-gel method on glass substrates." Int. J. of Universal Print 4(8): 508-516 (2018).

Kim et al. "Effects of Cu doping on nickel oxide thin film prepared by sol-gel solution process." Optik 125(12): 2899-2901 (2014).

* cited by examiner

SOL-GEL MATERIAL, AND USE THEREOF

CROSS-REFERENCE TO RELATED APPLICATIONS

This application is a 35 U.S.C. § 371 National Phase Entry Application of International Patent Application No. PCT/EP2019/081986 filed on Nov. 20, 2019 which claims benefit under 35 U.S.C. § 119(d) of the GB Application No. 1818900.1 filed Nov. 20, 2018, the contents of both of which are incorporated herein by reference in their entireties.

FIELD OF THE INVENTION

The present invention relates to a sol-gel material. Also contemplated are thermophotovoltaic devices.

BACKGROUND TO THE INVENTION

A thermophotovoltaic (TPV) is a device that can convert thermal radiation into electricity. Thermal radiation produced by a surface heated by a heat source is used in a TPV cell to generate electricity. A TPV device consists of four basic components shown in FIG. 1; (i) heat energy source, (ii) absorber, (iii) emitter and, (iv) TPV cell. In solar TPV systems, the absorber is used to convert the solar energy into thermal energy. The ideal absorber would be able to absorb all solar energy spectrum that arrives at the earth surface. An emitter material surface, facing the thermophotovoltaic (TPV) cell re-emits a narrower displaced thermal spectrum. The photons emitted from the emitter incident on the TPV cell generate electricity. The presence of an intermediate material allows various forms of heat input to be used, making this technology a promising candidate for the hybridization of multiple heat sources including solar, biomass, fuel/gas burner or any other high temperature heat source. Theoretically, a TPV cell has a potential heat to electricity conversion efficiency of 85.4%.

At present Gallium Antimonide (GaSb) is widely used as a TPV cell having a bandgap of 0.72 eV. The cell bandgap refers to the device operating temperature and the selective spectrum of photonic wavelength of thermal radiation. The effective operating temperature range for Gasb is 1400° C. or above. A spectrally matched emitter can transfer radiation with specific wavelength that corresponds to the TPV cell bandgap. Previous research has shown that a tape casted Magnesium Oxide (MgO) doped with 2 mol % Nickel Oxide (NiO) exhibits an emissivity of 90% at a wavelength of 1.4 μm for temperatures of 1268° C., 1341° C., and 1404° C. This emissivity however drops to 10% when the wavelength is displaced at 3 μm [1, 2]. However, this MgO—NiO emitter material is primarily made from powder that makes it difficult to integrate with a high heat source.

It is an object of the invention to overcome at least one of the above-referenced problems.

SUMMARY OF THE INVENTION

The present invention addresses the need for an emitter material that can be used in TPV cells, and that is easier to integrate with a high heat source compared with conventional MgO—NiO emitter powders. These objectives are met by providing the emitter material as a sol-gel. Sol-gels are semi-solid and highly heat-stable, therefore capable of being coated onto a high heat surface (for example by dip, spin, or spray coating), providing a greater level of flexibility as regards the types of surfaces that the emitter material can be applied to. In addition, coating of a sol-gel emitter material onto a high heat surface provides a better bonding than laminating an oxide emitter material, which provides better thermal conductivity for a sol-gel emitter and reduces thermal losses. The invention therefore relates to a metal oxide doped nickel oxide—sol-gels, TPV systems that employ the sol-gel as the emitter material, and methods for forming the metal oxide doped nickel oxide sol-gels.

According to a first aspect of the present invention, there is provided metal oxide doped (typically magnesium or zirconium doped) nickel-oxide sol-gel (hereafter "sol-gel of the invention").

In one embodiment, the metal is selected from magnesium, zirconium chromium or aluminium. In one embodiment, the metal is selected from magnesium and zirconium.

In one embodiment, the sol-gel material comprises more than 90 mol %. metal oxide, and less than 10% nickel dopant (mol %).

In one embodiment, the sol-gel material comprises more than 95 mol % metal oxide, and less than 5% nickel dopant (mol %).

In one embodiment, the sol-gel material comprises 97-99% metal oxide (i.e. about 98%), and about 1-3% nickel dopant (i.e. about 2%) (mol %).

In one embodiment, the metal is magnesium.

In one embodiment, the sol-gel material is dried to remove solvents, providing a material that has substantially lower amounts of solvent. In some embodiments, the sol-gel material is dried after coating on to an absorber surface. As used herein, the term "sol-gel material" refers to sol-gels having a liquid phase and sol-gels in which the liquid phase is partially, predominantly or fully removed.

In another aspect, the invention relates to a thermophotovoltaic (TPV) system, comprising:
I. a substrate (which may be an absorber surface, or surface of a high-heat source such as a wall of a boiler);
II. an emitter material adhered to the substrate; and
III. a thermophotovoltaic (TPV) cell, characterised in that the emitter material is typically a sol-gel material according to the invention.

In one embodiment, the substrate is an absorber surface configured to absorb light (for example, solar light) and emit heat (i.e. convert light spectrum energy into thermal spectrum energy). Thus, the system may be a solar thermophotovoltaic (STPV) system. Suitable absorber materials for such systems include material that exhibit high absorption of light radiation and high emission of thermal (black body) radiation. Examples of materials include tungsten and tantalum photonic crystal absorbers.

In one embodiment, the substrate is a surface of a high temperature heat source. Examples include walls of boilers, burners, nuclear reactors, steam generators, condensers, and heat exhausts. In one embodiment, the high temperature heat source is part of an electricity generating system, for example a nuclear or fossil fuel power station. Thus, the system of the invention may be implemented in a power station, as a way of harvesting or recovering waste energy.

In another embodiment, the system comprises a high heat source. In this embodiment, the substrate is a part of the high heat source (for example a wall of the high heat source). The system may be a portable or mobile system. Examples include the portable propane-fired TPV power system described in Fraas et al [3].

In another aspect, the invention provides a high heat source having a surface and a coating of a sol-gel material on the surface. In one embodiment, the sol-gel material is coated on the surface by a process selected from dip-coating, spin-coating and spray-coating. In one embodiment, the sol-gel is substantially free of solvent. In one embodiment, the high heat source is selected from a boiler, burner and a condenser.

In another aspect, the invention relates to the use of a sol gel material of the invention as an emitter material in a thermophotovoltaic (TPV) system. In one embodiment, the sol-gel material is substantially free of solvent.

In another aspect, the invention provides a method of forming a sol-gel material of the invention, comprising the steps of:
I. providing a solution of metal oxide precursor;
II. providing a solution of nickel dopant precursor;
III. mixing the two solutions to provide a colloidal sol; and
IV. dehydrating the colloidal sol to provide the sol-gel.

In one embodiment, the metal oxide precursor is a magnesium oxide or zirconium oxide precursor. In one embodiment, the metal oxide precursor is selected from a nitrate and/or an alkoxide. In one embodiment, the nickel dopant precursor is selected from a nitrate and/or an alkoxide. In one embodiment, the precursor is a hydrate, for example a hexahydrate.

In one embodiment, the sol-gel material is a—magnesium oxide doped nickel oxide sol-gel, and the method comprises the steps of:
I. providing a magnesium nitrate hydrate precursor solution;
II. providing a nickel dopant precursor solution;
III. mixing the two solutions to provide a colloidal sol; and
IV. dehydrating the colloidal sol to provide the magnesium oxide doped nickel oxide.

In one embodiment, the magnesium nitrate hydrate precursor solution is formed by diluting magnesium nitrate hexahydrate is a non-aqueous solvent (such as an alcohol, i.e. isopropyl alcohol).

In one embodiment, the nickel dopant precursor solution is formed by mixing nickel chloride hexahydrate with water.

Thus, in one embodiment, the sol-gel material is a magnesium oxide doped nickel oxide sol-gel, and the method comprises the steps of:
I. providing a magnesium nitrate hydrate precursor solution by diluting magnesium nitrate hexahydrate is an alcohol solvent;
II. providing a nickel alkoxide dopant precursor solution by mixing nickel chloride hexahydrate with water;
III. mixing the two solutions to provide a colloidal sol; and
IV. dehydrating the colloidal sol to provide the magnesium oxide doped nickel oxide sol-gel.

In another embodiment, sol-gel material is a zirconium oxide doped nickel oxide sol-gel, and the method comprises the steps of:
I. providing a zirconium alkoxide precursor solution;
II. providing a nickel alkoxide dopant precursor solution;
III. mixing the two solutions to provide a first colloidal sol;
IV. adding water and solvent to the first colloidal sol to release nickel ions and generate a second colloidal sol; and
V. dehydrating the second colloidal sol to provide the zirconium oxide doped nickel oxide.

In one embodiment, the zirconium alkoxide is zirconium propoxide.

In one embodiment, the zirconium alkoxide precursor solution is formed by diluting the zirconium alkoxide in acid (i.e. methacrylic acid), stirring for a suitable period of time (i.e. 5-30 minutes), adding a solvent to disperse the solution, and further stirring of the solution. The solvent is typically a non-aqueous solvent (such as an alcohol, i.e. isopropyl alcohol).

In one embodiment, the nickel alkoxide dopant precursor solution is formed by mixing nickel 2-methoxyethoxide in an alcohol, for example 2-methoxymethanol.

In one embodiment, sol-gel material is a zirconium oxide doped nickel oxide sol-gel, and the method comprises the steps of:
I. providing a zirconium alkoxide precursor solution by diluting the zirconium alkoxide in acid (i.e. methacrylic acid), stirring for a suitable period of time (i.e. 5-30 minutes), adding a solvent to disperse the solution, and further stirring of the solution;
II. providing a nickel alkoxide dopant precursor solution by mixing nickel 2-methoxyethoxide in an alcohol, for example 2-methoxymethanol;
III. mixing the two solutions to provide a first colloidal sol;
IV. adding water and solvent to the first colloidal sol to release nickel ions and generate a second colloidal sol; and
V. dehydrating the second colloidal sol to provide the zirconium oxide doped nickel oxide sol-gel.

In embodiment, the two solutions are mixed for at least 1, 6, 10, 18 or 24 hours.

In one embodiment, the sol is dried at about 70° C. for about 24 hours, or an equivalent time-temperature combination.

Other aspects and preferred embodiments of the invention are defined and described in the other claims set out below.

DETAILED DESCRIPTION OF THE INVENTION

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "sol-gel material" refers to a—metal alkoxide doped nickel prepared by a sol-gel process. The sol-gel process is known to the person skilled in the art, and is described below and in numerous references [4]. The process generally involves providing a hydrolysable metal precursor as a monomer, (for example a metal alkoxide or nitrate), adding water and optionally a catalyst (i.e. an acid or a base) to hydrolyse the monomer and allow condensation to take place. This results in the formation of colloidal dispersion (i.e. a sol) of polymer matrix comprising the metal oxide (solid phase) and a liquid phase (solvent).

In the present case, the dopant is homogenously distributed throughout the solid phase. The metal is typically magnesium, zirconium, chromium or aluminium. The sol is then treated (generally removal of solvent by drying) to provide the sol gel. The sol-gel is a viscous liquid enabling it to be coated onto a substrate by a suitable process, for example dip-coating, spray-coating or spin-coating. Once coated onto a very hot surface, remaining solvent in the sol-gel will be removed providing a fully stable and hard coating. The sol-gel ideally comprises about 2 mol % nickel dopant and about 98 mol % metal (i.e. magnesium or zirconium) oxide, although the amounts of both metal oxides and dopant can be varied according to the requirements. For use as an emitter material, a 2:98 mol % ratio is preferred.

Figure 1:
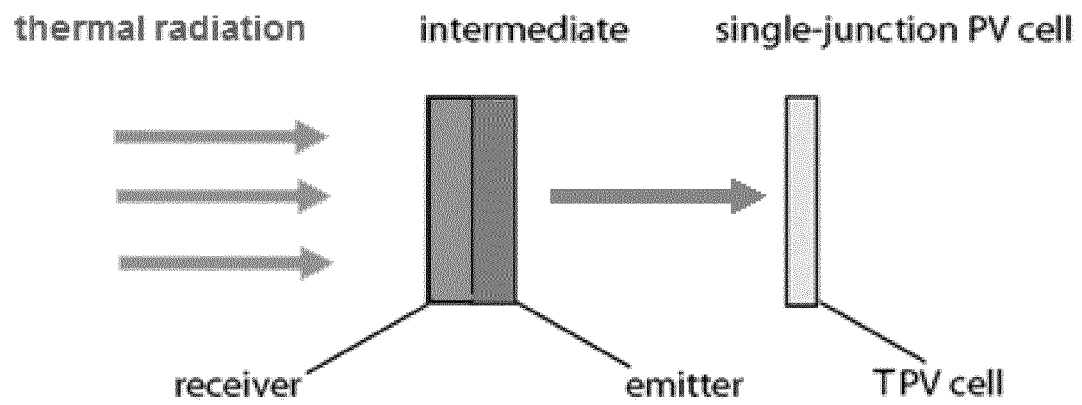
FIG. 1 (comparative): An illustration of a thermophotovoltaic device.

As used herein, the term "thermophotovoltaic (TPV) system" refers to a device that can convert thermal radiation into electricity. Thermal radiation produced by a surface heated by a heat source is used in a TPV cell to generate electricity. A TPV device consists of four basic components shown in FIG. 1; (i) heat energy source, (ii) absorber, (iii) emitter and, (iv) TPV cell. The heat required for a TPV system is determined by the bandgap of the TPV cell. For solar thermophotovoltraic (STPV) systems the heat source is the sun.

As used herein, the term "mol. %" refers to molecular percentage.

As used herein, the term "high heat source" includes industrial equipment that reaches a high temperature during normal operation. Examples include boilers used to generate steam (often used in power stations), burners (employed to generate heat), hot fluid exhaust ports, and condensers (such as employed in power stations). Generally, the high heat source is one which operates at a temperature of 800-15000.

As used herein, the term "metal oxide precursor" refers to a metal and oxygen containing moiety, often a hydrate, that when diluted in a solvent generated a metal oxide. Generally, the metal oxide precursor is a metal alkoxide and a metal nitrate. Examples of magnesium oxide precursors include magnesium alkoxides including magnesium methoxide, magnesium ethoxide, magnesium propoxide and magnesium butoxide, and magnesium salts including magnesium nitrates and magnesium acetates. Examples of zirconium oxide precursors include zirconium alkoxides such as zirconium ethoxide, zirconium propoxide, zirconium butoxide, any zirconium salts including zirconium acetates and zirconium nitrates.

As used herein, the term "nickel dopant precursor" refers to a nickel containing moiety configured to release nickel ions when in solution. Examples include nickel chloride hexahydrate and nickel 2-methoxyethoxide.

As used herein, the term "portable" as applied to a TPV system refers to a system that is suitable for moving from site-to-site. Examples include systems that can be used in remote locations, in campervans and caravans, and as a replacement for electrical generators employed at concerts and as a back-up power supply.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Magnesium (Mg)—Oxide ($O_2$)—Nickel (Ni) Sol-Gel Preparation:

10 g of magnesium nitrate hexahydrate [Mg $(NO_3)_2$, $6H_2O$] is dispersed into 200 ml of isopropyl alcohol (IPA) and stirred at 100 rpm at room temperature for 10 min. 0.189 g of nickel chloride hexahydrate [($NiCl_2 \cdot 6H_2O$) (2% of 10 g)] is mixed with 0.154 ml of $H_2O$ and stirred for 10 min to create $Ni^{2+}$. These two solutions are mixed and stirred for 24 hr at room temperature to create the sol. The sol is then dried for 24 hr at 70° C. to form the Mg—O—Ni sol-gel.

Thermal Analysis:

Thermal analyses have been performed to identify the glass transition phase and thermal energy variation of the sample employing Thermal Gravimetric Analysis (TGA) and Differential Scanning Calorimetry (DSC), respectively. TGA shows the mass losses in two steps, one in the range of 24° C. to 200° C. and the other from 600° C. to 1200° C. The mass loss of the compound material translates the physicochemical phenomena taking places, such as materials degradation by oxidation or structural changes, when the temperature is gradually increased.

DSC shows the thermal exchange with the environment as function of temperature. An endothermic reaction occurs when the thermal energy is absorbed by the sample and when it is released it is call exothermic reaction. The DSC curves show the endothermic and exothermic phenomenon while temperature is gradually increased up to 1200° C.

Figure 2:
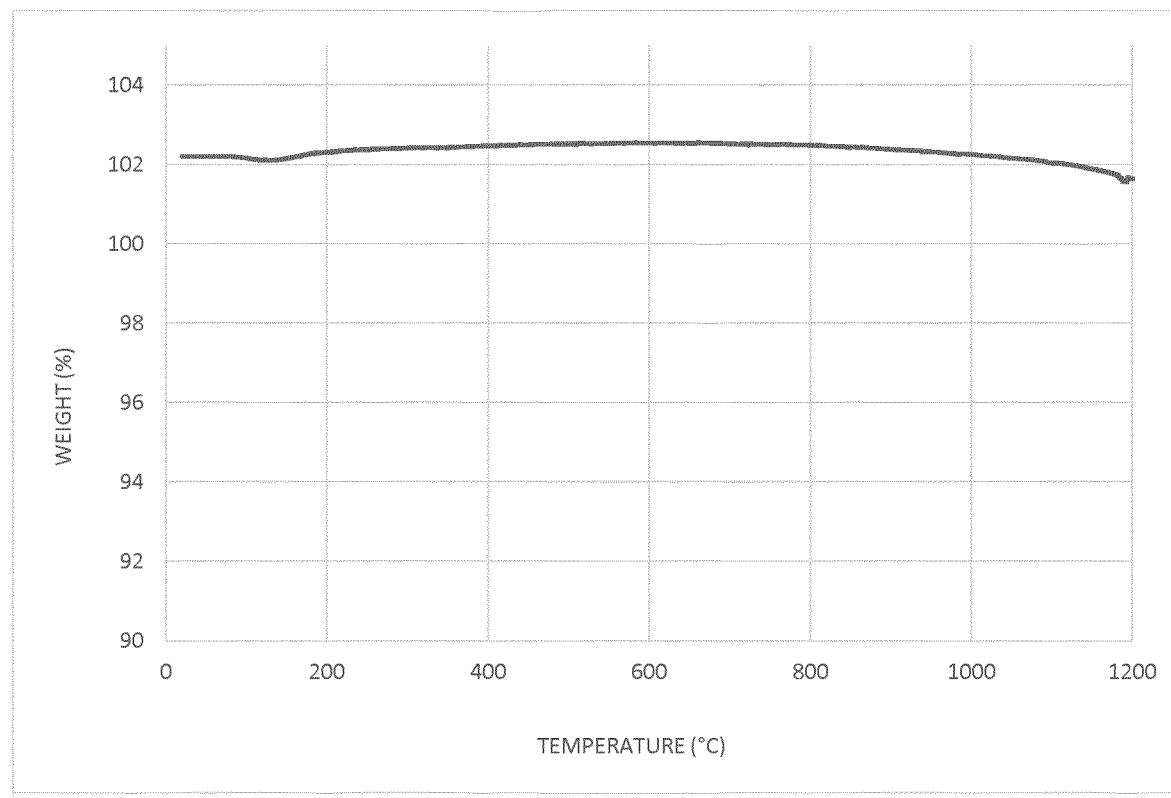
FIG. 2: Thermal Gravimetric Analysis (TGA) of a nickel-(2%) magnesium oxide (98%) sol-gel.

Mg—$O_2$— NiO Glass Transition (TG):

The TGA results in air atmosphere show two steps of mass reduction (FIG. 2). The first loss occurs at the range of 85° C. to 160° C. The amount of mass reduction is calculated as 0.05%. Within this thermal domain, the mass reduction is associated to the dehydration of the sample as the $H_2O$ contents start to vaporise. The second significant mass loss occurs at the broader temperature range from 600° C. to 1200° C. The total mass loss is calculated at 0.98%, which is associated to the possible elimination of the nitrates and chlorides components used within the precursor material. The weak weight loss translates the high purity and thermal stability of the developed material.

Figure 3:
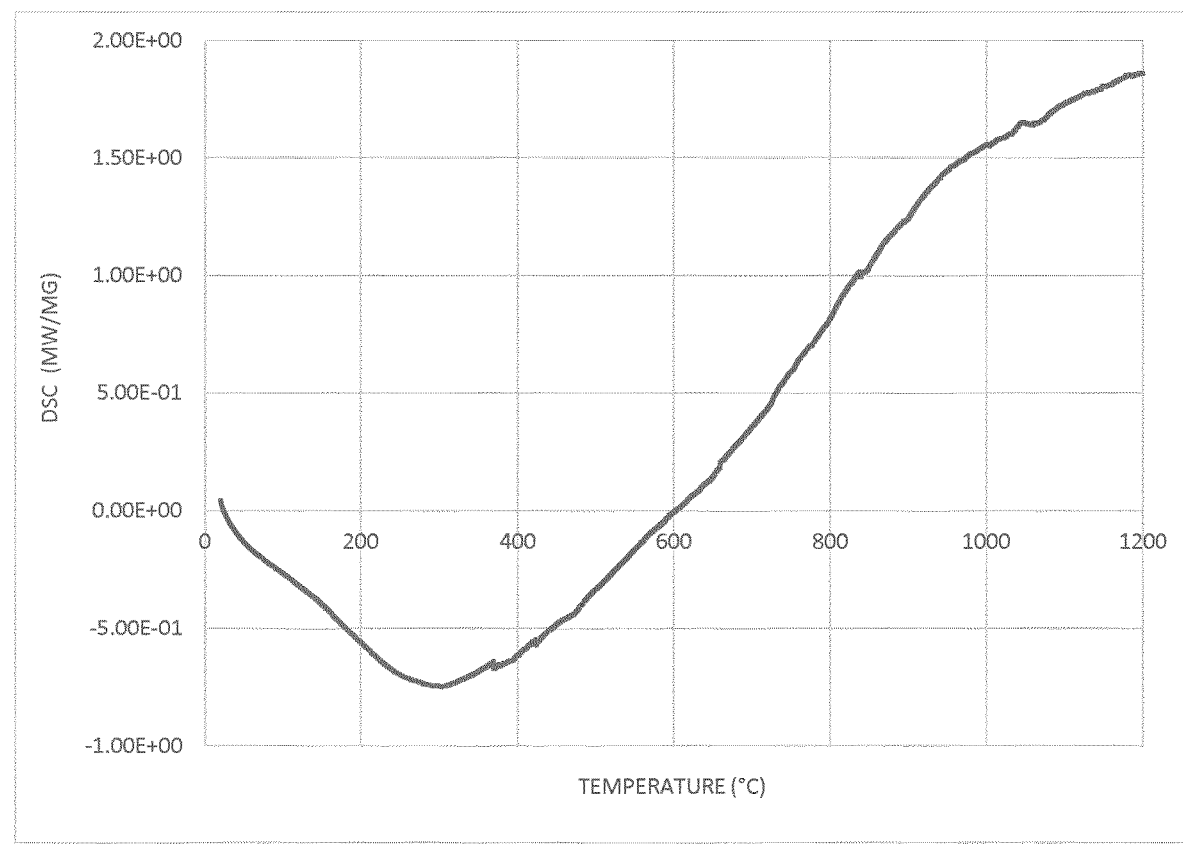
FIG. 3: Differential Scanning Calorimetry (DSC) of a nickel (2%) magnesium oxide (98%) sol-gel material of the invention

The DSC curve of Mg/Ni oxide material in FIG. 3 shows that an endothermic reaction has been taken place from 25° C. to 285° C. Although no sharp endotherm peak has been found that suggests no phase change during the process. The exothermic reaction takes place gradually as the temperature increases from 285° C. up to 1200° C.

Figure 4:
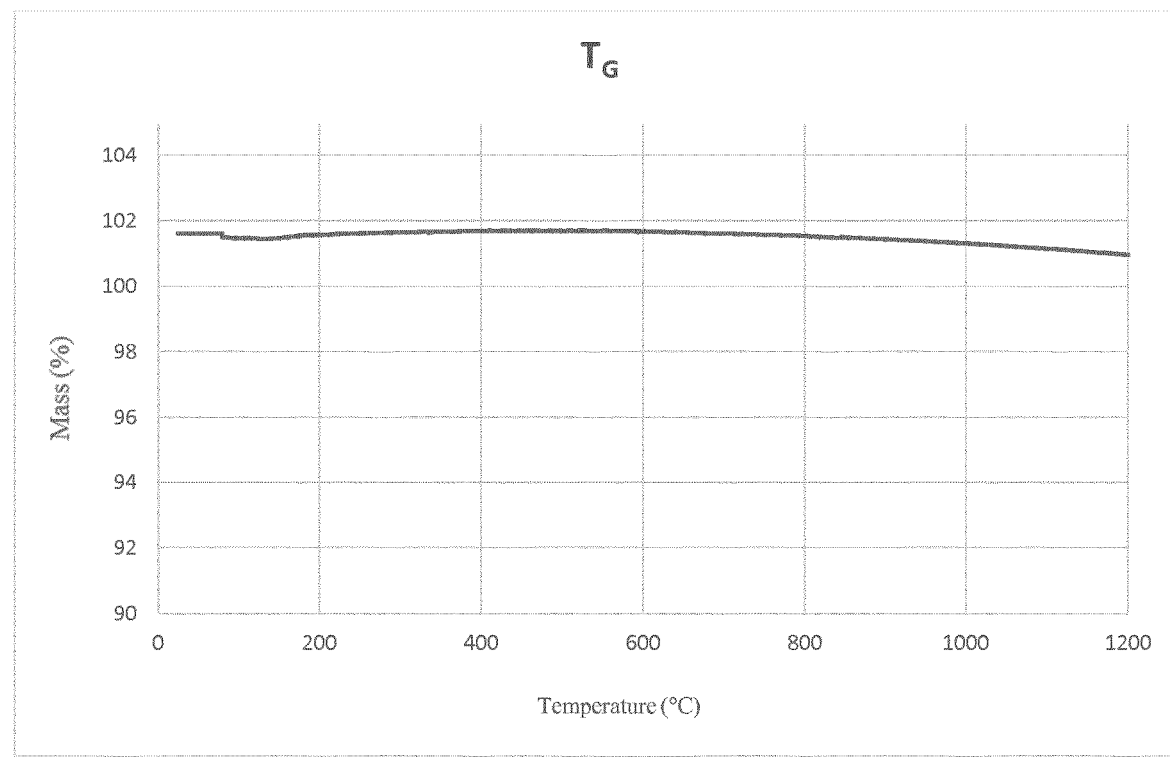
FIG. 4: Thermal Gravimetric Analysis (TGA) a nickel (2%) zirconium oxide (98%) sol-gel material of the invention

Zirconium—Nickel Sol-Gel Sample Preparation:

10 g of zirconium (IV) n-propoxide [$Zr(OCH_2CH_2CH_3)_4$] supplied by Sigma Aldrich is diluted into 1.83 ml of methacrylic acid and stirred for 15 min at ambient temperature with 100 rpm. After 15 min of stirring, 200 ml of isopropyl alcohol (IPA) is added to disperse the solution and further left stirring for 5 min. 1.82 ml of nickel 2-methoxyethoxide, 5% w/v in 2-methoxyethanol, corresponding to mol 2%, is added to the zirconium (IV) n-propoxide solution and left stirring for 5 min to create Sol-1. A mixture of 0.155 ml of $H_2O$ and 20 ml of IPA is then added slowly to Sol-1 to create the final solution (Sol-2). Sol-2 is then left stirring at room temperature for 24 hours. Following this 24 hours stirring, the solution is dried at 70° C. for 24 hours to form the gel form. This provides a sol-gel material composed of 98% of zirconium oxide and 2% of nickel oxide Thermal Stability Test of Zirconium—Nickel Sol-Gel Sample The Thermal Gravimetric Analysis (TGA) analysis performed in ambient atmosphere shows two steps of mass reduction as shown in FIG. 4. The first loss occurs at the range of 85° C. to 160° C. The amount of mass reduction is calculated as 0.071%. This mass reduction corresponds to the dehydration of the sample as the residual $H_2O$ and solvents is eliminated within this temperature range. The second significant mass loss occurs at the broader temperature range from 600° C. to 1200° C. The total mass loss is calculated at 0.68%.

Figure 5:
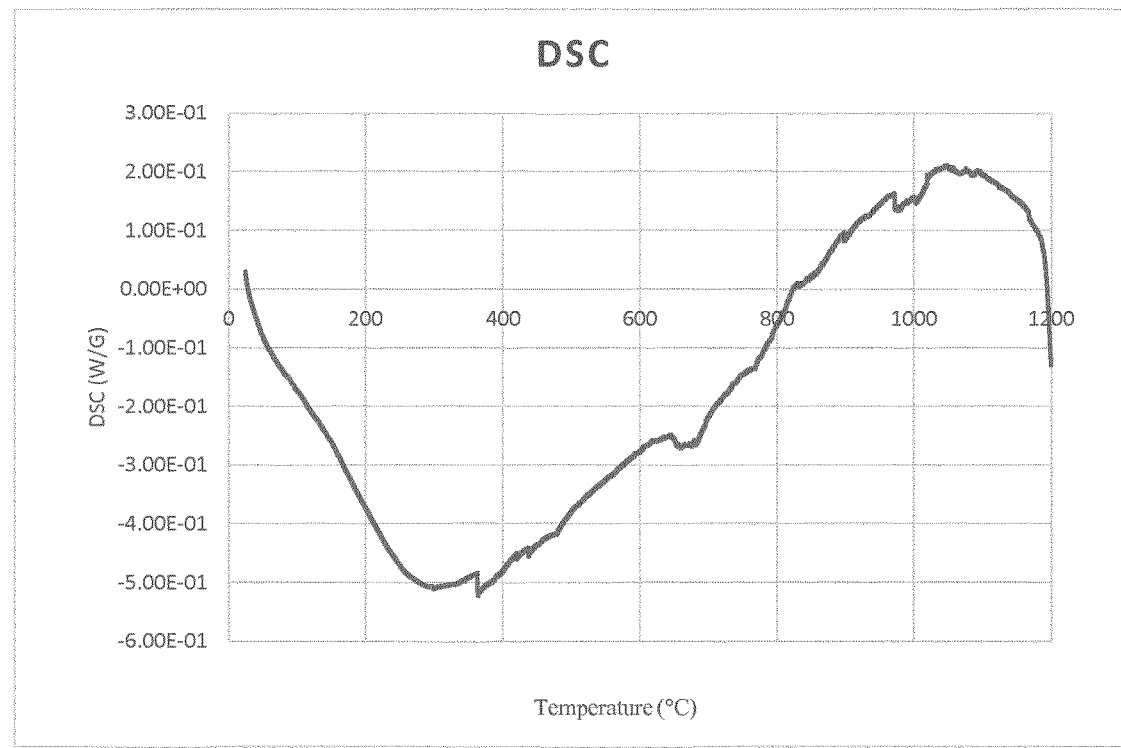
FIG. 5: Differential Scanning Calorimetry (DSC) of a nickel (2%) zirconium oxide (98%) sol-gel material of the invention.

The Differential Scanning Calorimetry (DSC) analysis performed in ambient atmosphere in shown in FIG. 5. An endothermic phenomenon is observed at low temperatures. The heat is absorbed in a constant rate from 24° C. till up to 325° C. After 325° C. a small exothermic phenomenon is observed until 363° C. An endothermic peak has been found at 364° C. This phenomenon may have occurred due to the presence of two different crystal structures of $ZrO_2$ and NiO in a compound material. Although there are few endothermic small peaks, a gradual increase of thermal energy emission is observed above 364° C. The exothermic peak has been located at temperature 1062° C. The thermal energy emission decreases abruptly after 1100° C. and continues up to 1200° C., suggesting the formation of a crystalline structure.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

REFERENCES

1. Fraas, J. Avery, L. Minkin, and H. X. Huang. Design of a Matched IR Emitter for a Portable Propane Fired TPV Power System. JX Crystals Inc 2014; 1105 12.
2. Donald L. Chubb, Fundamentals of Thermophotovoltaic Energy Conversion, Published by Elsevier B.V; First edition 2007; ISBN: 978-0-444-52721-9.
3. Fraas. L. M, Gasb S, Tpv T, The C. Chapter 11 (With 2016 Addendum): Thermophotovoltaics using Infrared Sensitive Cells 2016; 11.
4. Brinker, C. and Scherer, G. (1990). Sol-Gel Science. The Physics and Chemistry of Sol-Gel Processing (Academic Press, Inc.: San Diego USA, Sakka, S. (2016). History of the Sol-Gel Chemistry and Technology. In Handbook of Sol-Gel Science and Technology, eds. L. Klein et al. (Springer International Publishing: Switzerland)

What is claimed is:

1. A method of making nickel oxide doped metal oxide sol-gel, and the method comprising the steps of:
   I. providing a magnesium nitrate hydrate precursor solution;
   II. providing a nickel alkoxide dopant precursor solution comprising nickel chloride hexahydrate and water;
   III. mixing the two solutions to provide a colloidal sol; and
   IV. dehydrating the colloidal sol to provide the nickel oxide doped magnesium oxide sol-gel.

2. A method of making a nickel oxide doped zirconium oxide sol-gel, the method comprising the steps of:
   providing a zirconium alkoxide precursor solution by diluting the zirconium alkoxide in Methacrylic acid, stirring for a suitable period of time, adding a solvent to disperse the solution, and further stirring of the solution;
   providing a nickel alkoxide dopant precursor solution by mixing nickel 2-methoxyethoxide in an alcohol;
   mixing the two solutions to provide a first colloidal sol;
   adding water and solvent to the first colloidal sol to release nickel ions and generate a second colloidal sol; and
   dehydrating the second colloidal sol to provide the zirconium oxide doped nickel oxide sol-gel.

* * * * *